United States Patent
Ackerman et al.

(10) Patent No.: US 9,419,801 B2
(45) Date of Patent: Aug. 16, 2016

(54) SYSTEM AND METHOD FOR TRANSMITTING NEEDED PORTIONS OF A DATA FILE BETWEEN NETWORKED COMPUTERS

(75) Inventors: Steve F. Ackerman, San Antonio, TX (US); Christopher S. Hull, Salt Lake City, UT (US); Ryan Q. Stokes, Holladay, UT (US)

(73) Assignee: Infrascale Inc., El Segundo, CA (US)

( * ) Notice: Subject to any disclaimer, the term of this patent is extended or adjusted under 35 U.S.C. 154(b) by 1477 days.

(21) Appl. No.: 12/464,785

(22) Filed: May 12, 2009

(65) Prior Publication Data

US 2010/0293142 A1    Nov. 18, 2010

(51) Int. Cl.
- *G06F 15/16* (2006.01)
- *H04L 9/32* (2006.01)
- *H04L 29/08* (2006.01)

(52) U.S. Cl.
CPC .............. *H04L 9/3236* (2013.01); *H04L 67/06* (2013.01); *H04L 2209/30* (2013.01); *H04L 2209/60* (2013.01)

(58) Field of Classification Search
USPC ........................................................ 709/201
See application file for complete search history.

(56) References Cited

U.S. PATENT DOCUMENTS

| | | |
|---|---|---|
| 2008/0034268 A1 | 2/2008 | Dodd et al. |
| 2008/0104107 A1 | 5/2008 | Schwaab et al. |
| 2008/0104146 A1 | 5/2008 | Schwaab et al. |
| 2008/0104147 A1 | 5/2008 | Schwaab et al. |
| 2008/0243953 A1 | 10/2008 | Wu et al. |
| 2008/0244204 A1* | 10/2008 | Cremelie et al. .............. 711/162 |
| 2008/0263109 A1 | 10/2008 | Patterson |
| 2008/0294696 A1 | 11/2008 | Frandzel |
| 2009/0013129 A1 | 1/2009 | Bondurant |
| 2010/0042790 A1* | 2/2010 | Mondal et al. ................ 711/161 |
| 2010/0162039 A1* | 6/2010 | Goroff et al. ..................... 714/6 |

OTHER PUBLICATIONS

Kelly et al, "RFC 4868", May 2007, Network Working Group, p. 1-43.*

* cited by examiner

*Primary Examiner* — Ryan Jakovac
(74) *Attorney, Agent, or Firm* — Thorpe North & Western LLP (57) ABSTRACT

A system and method for communicating a data file between networked computers is disclosed. The method includes the operation of requesting a data file consisting of a plurality of file blocks to be transferred from a source computing device to a destination computing device. A hash signature for each of the plurality of file blocks of the data file is sent from the source computing device to the destination computing device. It can be determined which of the file blocks of the data file are already located on the destination computing device based on the hash signature of each file block. The remaining file blocks can be transferred from the source to the destination computing device. The file can be constructed at the destination computing device from the plurality of file blocks.

8 Claims, 3 Drawing Sheets

SYSTEM AND METHOD FOR TRANSMITTING NEEDED PORTIONS OF A DATA FILE BETWEEN NETWORKED COMPUTERS

BACKGROUND

An effective disaster recovery strategy is to replicate important data to remote file-systems using digital communication networks, such as the Internet. This strategy, referred to herein as remote replication, transfers the data, referred to herein as the replication stream, from a local file-system to a remote file-system. This strategy is ineffective when the throughput capacity of the network is smaller than the production rate of the replication stream. The rate of data required for remote replication often exceeds a network's throughput capacity, especially for small to medium sized enterprise customers, with T1 or lower transmission rates being typical. Throughput capacities of available long-haul networks are increasing with new technology at the network, data link, and physical layers. However, these capacities are often still inadequate to meet the needs of a typical replication stream.

Techniques such as compression can increase effective capacity by reducing the needed bandwidth of the replication stream, but the reductions are often insufficient to allow the data to be transmitted faster than the production rate, especially with pre-compressed data.

Another remote replication strategy allows more efficient transmission of file data by using a previous version of a file for comparison. If such a file exists on both the local and remote file-systems, then a description, called a delta, of how to transform the old remote file into the new file can be transferred. Deltas between an old file and a new file are sufficient to constitute a replication stream for the file. This strategy is referred to herein as delta replication.

A generalized strategy of comparing prior and current versions of the same file to find differences can be straightforward and intuitive. But this only works after an initial copy has been transferred. Thus, each time a new file is created, a relatively large amount of information is transferred. A large number of new files can significantly slow the network or even exceed the network capacity.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Definitions

Block—for a given file, an individual segment of a plurality of fixed-size contiguous segments of data.

Blockcontent—for a given file, an individual segment of a plurality of fixed-size contiguous segments of data.

Block level replication—the transfer of blocks of written data to replicate a local file to a remote file location.

File data—all data residing within an individual file within a file system.

File system—a collection of data organized into files, often within containers which may hold files or other containers.

Replication stream—data transferred from a local file system to a remote file system for the purposes of replicating one or more files on the local file system to the remote file system.

Throughput capacity—the maximum rate at which data can be transferred across a digital communications network.

Blockprint—a cryptographic hash of a block.

Blockprint Database—a plurality of tuples comprising a blockprint, a storage location, an offset, and in some cases a block size.

Disclosure

Using digital communications networks, such as a local area network, wide area network, or the Internet, to transfer relatively large amounts of information can cause the communications networks to become bogged down. In a worse case scenario, remote replication of data may not be possible due to the large amount of new data created each day relative to the bandwidth of the network. The use of cryptographic hash functions can be used to reduce or eliminate the need to send duplicate data over a network.

A cryptographic hash function is a deterministic procedure that takes an arbitrary block of data and returns a fixed-size bit string, called the cryptographic hash value. The cryptographic hash value is also referred to as a hash signature. Even a small change to the data, such as a change to a single bit, can result in a large change to the hash signature. This property enables the hash signature to be used to reliably identify a specific block of data on a computer or a computer network.

A typical computer can contain thousands of files. A server or network may contain millions of files. The cryptographic hash function can be used to uniquely identify each file, or even portions of a file, by associating the file or portion of a file with a hash signature generated by applying the cryptographic hash function to the file or portion of the file.

In order to provide a desired quality of service, it is necessary that the probability of a duplicate hash signature is small compared to the number of separate hash signatures that are expected to be generated. The odds of there being a duplicate hash signature is referred to as collision resistance. Certain types of cryptographic hash functions have greater collision resistance than others. For example, the probability of a collision when using a Message-Digest algorithm 5 (MD5) cryptographic hash function is approximately one in 32. Thus, MD5 may not be useful in generating hash signatures for a computer with thousands of different files.

The secure hash algorithm (SHA) family of cryptographic hash functions was designed to have a greater level of collision resistance. For example, SHA-0 has a collision resistance value of approximately one in $2^{39}$. The SHA-1 algorithm has an even greater resistance of approximately one in $2^{63}$. To date, the SHA-2 algorithms have had no public attacks, so the collision resistance has not been estimated. Additional work is being done to develop a new secure hash algorithm standard, referred to as the SHA-3 algorithm. This algorithm should be even more secure than the SHA-2 algorithm. The SHA family of cryptographic hash algorithms can be used to generate an enormous number of unique hash signatures for files or parts of files located on a computer, server, or network, with an extremely small probability of generating the same hash signature for two different blocks of data. While the SHA family has been specifically mentioned, any cryptographic hash function having sufficient collision resistance can be used.

To reduce the amount of network traffic, it has been discovered that data files can be broken into smaller sizes referred to as file blocks or simply blocks. Each block can be associated with a unique hash signature. The hash signature can be created by applying a cryptographic hash function to each block to form the unique hash signature for that block.

The hash signature is also referred to as a block fingerprint, or simply a blockprint. The blockprint for each block in a file can then be sent across the network to a destination computing device in lieu of sending the entire file. The destination computing device can also contain a number of files. Selected files on the destination server can also be divided into blocks and be assigned blockprints. The destination server can be searched for each blockprint associated with a block from the file.

Given sufficient file data at the destination computing device, portions of any arbitrary file requiring replication may already be present at the destination computing device. Blocks associated with blockprints that are not already located at the destination computing device can then be transmitted across the network to the destination computing device. The blocks associated with blockprints already at the destination computing device can be used to reconstruct the file without the need for network transmission of every source block. Network traffic is thus reduced by sending only those data blocks that were not previously located at the file's designated destination.

While the use of blockprints to eliminate the need to send duplicate blocks can reduce the amount of network traffic, such a system should also be able to be accomplished within a reasonable time period to increase its usefulness. To reduce the amount of time needed to search a destination for particular blockprints, a hash signature database can be maintained that maps blockprints with their associated files. The database can also include additional information, such as the block's offset (location in a file) and length. In one embodiment, a file to be transmitted to a remote site can be encoded as a series of blockprints. A plurality of blockprint databases may be used to establish the existence of shared block data.

Assuming that all block prints can be identified on the remote site, the effective maximum compression is the ratio of the block size to the fingerprint size. For example, using 8 Kbyte blocks with an MD5 hash will result in a compression ratio of 512:1, assuming that all blockprints existed on the remote side.

A complete blockprint database can contain block prints for all block sizes at every offset of every file. However, the size of such a database can quickly become untenable for even a trivial number of files. For example, the storage requirements of the blockprints alone for a 16 Kbyte file using 8 Kbyte blocks is 128 Kbytes. For 4 Kbyte blocks, the block prints are 196 Kbytes. An effective culling strategy is needed to make such a database feasible.

In one embodiment, the size of the blockprint database can be reduced by limiting the block sizes and offsets to natural $2^n$ boundaries. In addition, different data sets can be optimized by sampling a range of block sizes and offsets to maximize effectiveness and minimize database size. Further optimization may be obtained by allowing different block sizes and offsets for different types (classes) of files. For example, text data can be highly redundant in small block sizes, whereas binary program file data will have redundant blocks of a consistently larger size. Therefore, text files can have a smaller block size selected relative to binary files. The actual block size may be selected for each type, or class, of file depending on the file's extension.

Additionally, it will not be likely for certain types of files to have duplicate blocks. For example, it is unlikely for a compressed zip file to contain any similar blocks to other zip files, even to a zip archive that contains the same files in a different order. Any type of compression or encryption will render most blockprint techniques to limited usefulness. Therefore, it may be determined that compressed or encrypted files will not be included in a blockprint database.

Computing block level differences in subsequent versions of a file is an effective way to reduce the quantity of data transmitted to the remote site for new versions of files. Additionally the blockprint database can be used to identify other potentially similar files for delta computation when no previous version of a file exists, or when a previous version may have a different name. Files that have one or more blocks in common with the file to be transferred can be evaluated to see which produces the smallest delta set. Database operational constraints can also influence the choice of optimal block sizes and offsets, as can be appreciated.

In one embodiment, a blockprint database can comprise a 4-tuple entry for each data block. The 4-tuple entry can include the data block hash signature, the storage address of the data block, the offset of the data block in the data file, and the size of the data block. Various constraints can be placed on this tuple, allowing some of the entries to be simplified or eliminated. For example, if the offset is fixed at zero and the block size is required to be the size of the file, the block print database reduces to a file print database. The file print database can form the basis of a content addressable file storage system. In another example, the block size can be a single fixed size. Therefore, the block size may not be needed in the tuple.

A minimal blockprint database can consist of a 3-tuple entry for each data block. The 3-tuple entry includes the data block's hash signature, the storage address of the data block, and the offset of the data block in the data file. Both the local and remote sides of the data transfer (i.e. the source computing device and the destination computing device) can maintain its own block print database. The destination computing device can verify the block prints that are located at the destination side and send back a list of missing blocks to enable the source computing device to provide only the necessary information. Some work can be eliminated a priori by extending the source database to track information about what blockprints are known to exist on the remote side.

Figure 1:
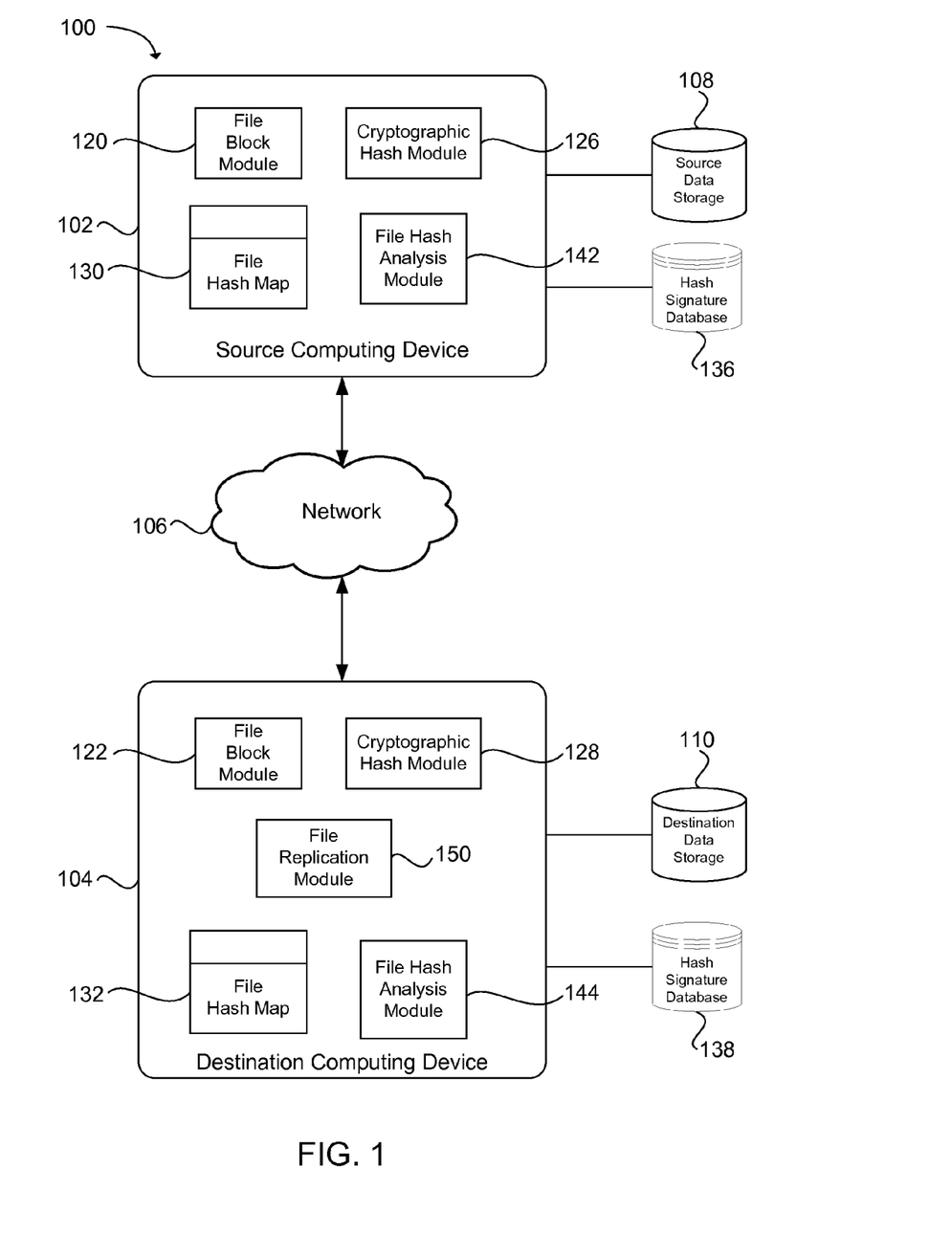
FIG. 1 is a block diagram of an embodiment of a system for communicating a data file between networked computers.

FIG. 1 provides an exemplary illustration of a block diagram for a system 100 for communicating a data file between networked computers. The system includes a source computing device 102 in communication with a destination computing device 104. The computing devices can be a hand held computing device, a laptop computer, a desktop computer, a server, or a server array.

The computing devices 102, 104 may communicate through a network 106. The network may be a local area network, a wide area network, an internet connection, or a wireless connection between two computing devices. The source and destination computing devices can be coupled to a data storage device 108, 110 respectively. The data storage devices may be located internal to the computing devices. Alternatively, the computing devices can be coupled to external data storage devices, such as external drives or server storage systems.

A file block module 120, 122 can be located on each of the source 102 and destination 104 computing devices. The file block module is configured to divide selected files on each computing device into a plurality of file blocks. Typically, files that may be backed up or transferred to another computer can be divided into the plurality of blocks. Files that have a low probability of being transferred, such as operating system files, may not be divided into blocks. As previously discussed, the size of the block file may be fixed or variable. In one embodiment, the block file size can be selected based on the file type. Files that have more repetition can have smaller block file sizes, while files that have less repetition can have larger block file sizes. Alternatively, a single block file size may be used, such as 512 Kbytes.

The system 100 further comprises a cryptographic hash module 126, 128 located on each of the source 102 and destination 104 computing devices. The cryptographic hash module is configured to form a hash signature for each file block of the selected files using a cryptographic hash function. As previously discussed, a cryptographic hash function such as a function from the SHA-2 family, can be used to generate a hash signature for each file block, with a very high probability that no two hash signatures are alike, even on a large server system containing quintillions of files. The same algorithm can be used on both the source 102 and destination 104 computing devices to enable identical blocks located on the two devices to have identical hash signatures.

Note that a final CRC checksum of the entire file can be used to guard against the highly unlikely, but theoretically possible blockprint collision, where a unique blockprint actually refers to disparate (non-duplicated) file blocks. These blockprints can be deprecated as detected resulting in the file blocks being distributed directly.

Each file that is divided in blocks can have a file hash map 130, 132 created on the respective source 102 and destination 104 computing devices. The file hash map can contain the hash signature (i.e. blockprint) for each of the file blocks of a selected file. The file hash map may also contain additional information, such as the storage address of the data block, the offset of the data block in the data file, and the size of the data block. The file hash map may be created prior to a request to transfer a file from the source to the destination computing device. Alternatively, the file hash map may be created at the time of the request. Creation of the map may be accomplished in a timely manner for relatively small files. However, for large files that will be divided into hundreds or thousands of blocks, the creation of the file hash map at the time of the transfer request may result in a noticeable delay.

In order to minimize the delay time, the information for each file that is contained in the file hash map may also be contained in a hash signature database 136, 138 coupled to the respective source 102 and destination 104 computing devices. The use of the database to contain the hash signatures and other desired file information can significantly increase the speed at which the hash map information can be sent from the source computing device to the destination computing device.

The system 100 can also include a file hash analysis module 142, 144 located on the source 102 and destination 104 computing devices. The file hash analysis module is configured to receive the file hash map for a selected file to be copied from the source computing device to the destination computing device. When the file hash map is received at the destination computing device, the file hash analysis module 144 can be used to determine which hash signatures and corresponding file blocks are already located at the destination computing device.

The system 100 further includes a file replication module 150 located on the destination computing device 104. The file replication module is configured to request from the source computing device 102 the file blocks whose corresponding hash signatures are not located on the destination computing device. The remaining file blocks can be transferred from the source computing device to the destination computing device via the network 106 connection. Once all of the file blocks that make up the file are present on the destination computing device, the selected file can be replicated.

For example, a user may desire to transfer a file having a size of 1 MByte+60 Bytes from the source computing device 102 to the destination computing device 104. The file block module 120 can be used to divide the file into 257 blocks. The cryptographic hash module 126 can generate 257 hash signatures. A file hash map 130 comprising a tuple for each file block can be formed that identifies the hash signature, the file location of each file block, and the location of each file block in the file (i.e. the offset). If the blocks are not of even length, the file hash map may also include the length of each block. Alternatively, all of this information may have been previously created and stored in the hash signature database 136. Each tuple can have a size of 32 bytes in this example.

The information in the file hash map 130 comprising 32 bytes for each of the 257 blocks, or 8,224 bytes can be communicated from the source computing device 102 to the destination computing device 104 via the network 106 connection. The destination computing device can then use the file hash analysis module 144 to determine which file blocks having identical hash signatures are already located on the destination computing device. In one embodiment, a bit field can be formed that is comprised of 257 bits, identifying which file blocks are already present on the destination computing device. The bit field can be sent to the source computing device and the file blocks that are not located on the destination computing device can be transferred. If all of the file blocks are already located on the destination computing device then there is approximately a 92% savings in network traffic, since only the 8,224 bytes (plus 257 bits) needed to be sent instead of the 1,000,060 bytes of the file. A request for a checksum may also be submitted from the source to the destination computing device. A return checksum can be sent from the destination to the source computing device. An acknowledgment receipt may also be sent from the destination to the source computing device.

The information in the file hash map 130 or from the hash value database 136 that is communicated over the network 106 can be secured and encrypted to provide security between the source computing device 102 and the destination computing device 104. For example, the information may be secured and encrypted using standard secure socket layer (SSL) technologies.

In another embodiment, the information contained in the destination hash signature database 138 can be communicated at selected intervals to the source hash signature database 136. For example, the databases may be synced at a selected interval of 30 minutes, 60 minutes, 2 hours, 4 hours, 12 hours, once per day, when requested, and so forth. When a request to transfer a single file, or a group of files, from the source computing device 102 to the destination computing device is received, the file hash analysis module 142 located on the source computing device 102 can check to see whether any of the files to be transferred have been altered since the information contained in the source hash signature database 136 was updated from the destination hash signature database 138 to include the file hash maps 132 from the destination computing device.

In this embodiment, the file hash analysis module 142 on the source computing device 102 can determine which file blocks of the requested file(s) are located on the destination computing device 104 by checking the source hash signature database 136 for the destination file hash maps 132. The remaining number of file blocks that are not located at the destination computing device 104 can be sent from the source to the destination computing device. The file hash analysis module 144 on the destination computing device 104 can verify that each of the blocks has been received. The file replication module 150 can then assemble the blocks to form the files at the destination computing device. The files can be stored on the destination data storage device 110 in a manner that enables the files to be accessed in a typical manner.

A more specific example will now be presented. This example provides one method for transferring a file. However, the example is not intended to be limiting. Other methods can also be used, depending on the type of computing device and operating system used.

When two computer systems comprising one or more computer processing units and one or more data storage device are connected via a data communications network (such as an Ethernet network), hash signatures, referred to in this example as blockprints, can be used in the following ways to efficiently replicate data from a source storage device to a destination storage device. This can be accomplished by extending a remote procedure call (RPC) technology such as Simple Object Access Protocol (SOAP) or Extensible Markup Language Remote Procedure Call (XMLRPC) with the following functional capabilities.

RPC technology can be used efficiently to replicate data from a source storage device to a destination storage device. In one embodiment XMLRPC can be used due to its ease of use and simplicity. Additionally, an RPC mechanism can be used that is asynchronous and has minimal latency. The XMLRPC can be used to accomplish this. The RPCs specified below operate asynchronously, meaning that the RPCs do not block execution or wait for data to be returned. Data is returned independently (or asynchronously) in a subsequent RPC after the request for data has been submitted and returned.

A Request Checksum RPC can be used to determine that a file transfer was successful. Though not mandatory, at any time either the source system or the target system can request a checksum from the other party for any file on the connected storage device over the network infrastructure. A FileSpec directive and a checksum algorithm directive can be embedded in the Request Checksum RPC call to facilitate interoperability between the two systems.

The FileSpec directive can detail a specific file, in a specific directory on a specific volume of the target storage device. The components of this directive are file name, file path, and file volume.

The checksum algorithm directive may be proposed by the requester. In one embodiment, the requestor can propose the use of multiple checksum algorithms in order of preference. The requestor may also choose not to select a specific algorithm. If using XML, an ordinal attribute can be applied to the element to uniquely designate preferential order. This directive can be used by the requesting system to communicate which checksum algorithms are understood and can be returned. Example algorithms are CRC, MD5, and SHA, though other types of cryptographic hash algorithms can be used. The request for a checksum provides the ability to audit operational compliance and assure correct functionality.

A Return Checksum RPC can be sent in response to a "Request Checksum" RPC. A computer system can issue a unique "Return Checksum" RPC call back to the requesting computer over the network infrastructure. This RPC call comprises a FileSpec directive, a checksum algorithm directive, a checksum directive, and an optional ErrorText directive.

The FileSpec directive is associated with the checksum value. The FileSpec directive can include the file name, the file path, and the file volume.

The checksum algorithm directive states which algorithm was used to generate the checksum. If the algorithm was not specified in the request, the responding computer can specify its preferred algorithm. The SHA-1 algorithm provides a good compromise between guaranteed uniqueness and speed of the algorithm on the CPU. If the request does specify one or more algorithms, the responding computer can state the most preferred algorithm that it can use to generate the checksum value. Otherwise, the responding computer may not return a checksum. Rather, it will return an error of 'unknown preferred checksum algorithm'.

The CheckSum directive contains the value of the checksum, if computable. The checksum value is computed by running the above specified content through the above stated algorithm. If the checksum cannot be computed, this information may not be included. This information may only be included if the checksum is valid. If invalid, the information (e.g. the XML element) can be completely excluded.

An ErrorText directive is an optional field that may be included when the request cannot be satisfied. Error messages include "No known checksum algorithm requested"; and "File does not exist".

The return of a requested checksum provides the ability to audit operational compliance and assure correct functionality.

A Request Replication RPC can be sent from a source computer to request replication for all or parts of its attached storage devices to a destination replication computer's storage devices through the RPC mechanism over the network infrastructure. The following directives can be embedded in the RPC call to initiate the exchange of file data between the two systems.

A FileSpec directive can detail a specific file, in a specific directory on a specific volume of the target storage device. The components of this directive are the file name, the file path, and the file volume. There can also be included certain operating system file attributes. Each operating system can have a subset of the following: CreationTimestamp, CreationUser, ModifiedTimestamp, ModificationUser, Permissions, Content-Type (this follows the RFC 2046i specification for internet media types), LinkType, DirectoryFlag, SystemFlag, HiddenFlag, ArchiveFlag, ReadOnlyFlag, DeviceFlag, TemporaryFlag, ReparsePoint, CompressedFlag, OfflineFlag, NotConentIndexedFlag, EncryptedFlag, and SparseFlag. Other types of operating system attributes may also be included, depending on the type of operating system being used and the needs of the user.

The computer receiving this request can be supplied with all of the storage meta data needed (e.g. file name, path and attributes) to locate, update and/or create the replicated meta data for the copy of the file on its storage device.

It is noted that file streams on computers running Windows® operating systems can be completely specified with the directives above. The association of any file stream to its file can be inferred from the file name specification.

A "Request All BlockPrints" RPC can be sent from the destination computing device. The destination computing device can initiate its detection of existing or duplicate content by requesting an ordered copy of all blockprints for the specified file. This RPC call uses the following directives to identify the source file.

A FileSpec directive can detail the specific source file, in a specific directory, on a specific volume of the source storage device. The components of this directive are the file name, the file path, and the file volume.

A "Return All BlockPrints" RPC can be sent from the source computing device. The source computing device can respond to a 'Request All BlockPrints' RPC by submitting this RPC back to the requesting, destination computing device. The information in this RPC provides a serialized, unique and identifying tokenization of the source file content in a significantly reduced size. The call uses a FileSpec directive and a BlockPrint directive and information fields to return the source file.

A FileSpec directive can detail the specific source file, in a specific directory, on a specific volume of the source storage device. The components of this directive are the file name, the file path, and the file volume.

In a BlockPrint directive, zero or more blockprint fields are distributed with the RPC, representing a unique and significantly contracted tokenization of the entire source file identified by the FileSpec above. In addition to the blockprint data, the following attributes are also available to precisely quantify each blockprint. This may be in the ordered sequence of blockprints that comprise the compressed tokenization of the entire data file.

A "PrintOrdinal" attribute is a single whole, natural number that specifies this blockprint's position in the strict sequence of all blockprints associated with the source data file identified by the FileSpec directive above.

A "BlockOrdinals" attribute provides one or more whole, natural numbers specifying which ordered data file subdivisions correspond directly to this blockprint. For example, given the strictly ordered subdivisions of the data that comprise the source file content of the FileSpec directive above, this list of ordinals can identify which subdivisions generate this blockprint when the subdivision content is run through the blockprint algorithm. For most data files this will be a one to one correspondence. But for highly redundant files, a single blockprint will be associated with several, identical data file subdivisions.

An "Algorithm" attribute discloses which cryptographic hash algorithm, such as SHA-1 is used. This information field specifies the algorithm used for the blockprint and allows for the utilization of more optimal algorithms when they become available. For example, when the SHA-3 algorithm has been completed, the SHA-3 algorithm may be used if desired.

A "PrintSize" attribute details the blockprint size that is designated. In one embodiment, the blockprint can have a size of 512 bytes. This field allows for variability since some algorithms and some specific media types benefit from the use of a shorter or longer blockprint size.

A "BlockSize" attribute details the size of the data that comprises the subdivision of the source file that is being fingerprinted. More specifically, the input to the blockprint and the portion of the file that is being represented by the blockprint as a unique identity token can be designated. For example, the BlockSize may be 512 Kbytes. This field allows for the final subdivision of the content to be smaller than the previous data file subdivisions. Additionally, shorter or longer subdivisions of the general source file will be of benefit to specific media types. For example, text documents can benefit from shorter blocksizes. This can increase the duplicate hit rate. However, music, image and compressed or encrypted files can benefit from larger block sizes since it will be rare to find duplication in other than exact copies of the source file. Thus in the case of these binary files, a large blocksize will minimize processing.

A "Request Block Content" RPC is used by the target computer system to request the actual data file content that is otherwise unavailable on the target computer system's attached storage device. It comprises a FileSpec directive and a Block directive.

The FileSpec directive can detail the specific source file, in a specific directory on a specific volume of the source storage device. The components of this directive are the file name, the file path, and the file volume.

The Blocks directive is a bit array sized such that there is a bit for each blockprint associated the source file specified by the FileSpec above. Each bit in the array is toggled to indicate whether to blockprint associated content is required or not. In one embodiment, a bit value of zero means that the block content is not required on the target storage device. A bit value of one means that the block content is unavailable, and thus required by the target computer system to place on the target storage device. Alternatively, the bit values can be reversed, depending upon the design of the RPC.

A "Return Block Content" RPC is used by the source computer system to return the actual data file content that has been requested by a target computer system. The Return Block Content RPC can include a FileSpec directive, a BlockPrint directive, and a BlockContent directive. The directives include the following information fields:

The FileSpec directive can detail the specific source file, in a specific directory on a specific volume of the source storage device. The components of this directive are the file name, the file path, and the file volume.

The BlockPrint directive provides the blockprint and attributes that represent a compressed identity token for the blockcontent or singular (or identical) content of the data file subdivision(s). Attributes that can be included as part of the BlockPrint directive are listed below. The list is not intended to be a complete or inclusive list.

A PrintOrdinal attribute provides a single whole, natural number that specifies this blockprint's position in the strict sequence of all blockprints associated with the source data file identified by the FileSpec above.

A BlockOrdinals attribute provides one or more whole, natural numbers specifying which ordered data file subdivisions correspond directly to this blockprint. Given the strictly ordered subdivisions of the data that comprise the source file content of the FileSpec above, this list of ordinals identify which subdivisions generate this blockprint when the subdivision content is run through the blockprint algorithm. For most data files this will be a one to one correspondence. But for highly redundant files, a single blockprint will be associated with several, identical data file subdivisions.

An Algorithm attribute provides the selected blockprint algorithm, such as the SHA-1 algorithm. This information field specifies the algorithm used for the blockprint and allows for utilization of more optimal algorithms when they become available.

A PrintSize attribute is a field that allows for variability since some algorithms and some specific Media Types benefit from a shorter or longer blockprint size. In one embodiment, 512 Bytes is selected as the size for the data that comprises the blockprint.

A BlockSize attribute is a field that allows for the final subdivision of the content to be smaller than the previous data file subdivisions. In one embodiment, the BlockSize attribute can be selected as 512 Kbytes for the data that comprises the subdivision of the source file that is being fingerprinted. The input to the blockprint and the portion of the file that is being represented by the blockprint as a unique identity token.

A BlockContent attribute is a complete, fidelity copy of the subdivision(s) of the source data file that generate the single associated blockprint when run through the specified algorithms above.

With the information provided by the Return Block Content RPC, the target computer system can replicate one or more identical source files on the destination storage device connected to the destination computer system. Once all requested blockcontents are returned the destination storage device will have a fidelity copy of the data file on the source storage system.

In another embodiment, on a computer system, comprising a CPU and an attached storage device with blockprint technology as discussed above, a missing or damaged file can be reconstructed, in whole or in part without the need to copy the entire file from the source computing device to the destination computing device. The file may be replaced or repaired utilizing the following steps.

A full map of blockprints of the missing or damaged file can be established, either from a previous analysis (e.g. by storing the blockprints and blockcontent associations from an earlier replication), or by using the protocols above (e.g. 'Return All BlockPrints') to query the blockprint map from another computer system with an attached storage device that is known to have a valid and correct copy of the missing or corrupt file.

If needed, the file can be recreated with associated file attributes that were stored with the FileSpec of the blockprint or were copied from a legitimate copy of the file from another storage device.

With the complete blockprint map for the file needing reconstitution, blockcontent associations to other uncorrupted files on the attached storage device can be used.

Valid and uncorrupted blockcontent portions from other peer files can be used to rewrite the corrupted file into the correct subdivisions of the file to enable the missing or damaged file to be reconstituted. The following steps can be used:
 (1) open the target file and allocate the file size based upon what can be calculated from the blockprint map; e.g. from a summation of the blocksize times the number of blockordinals for each blockprint in the map;
 (2) For each blockprint in the map:
   (i) For each blockordinal in the blockprint:
     (a) seek to the subdivision in the file based upon the blocksize times the (blockordinal minus one);
     (b) write the blockcontents; and
 (3) close the target file.

For the remaining blockprints (if any) that do not have associated blockcontent matches to valid and uncorrupted files on the target file system, the 'Return Block Content' protocol can be used to retrieve and write out the remaining blockcontent portions.

This approach can significantly reduce the transfer of information across the network infrastructures, between the attached storage devices of computer systems.

This approach also provides for data redundancy since a file can be restored from self or from any arbitrary computer systems (peers or servers) that have either a copy of the missing or corrupted file or a complete blockprint map for the missing or corrupted file.

Figure 2:
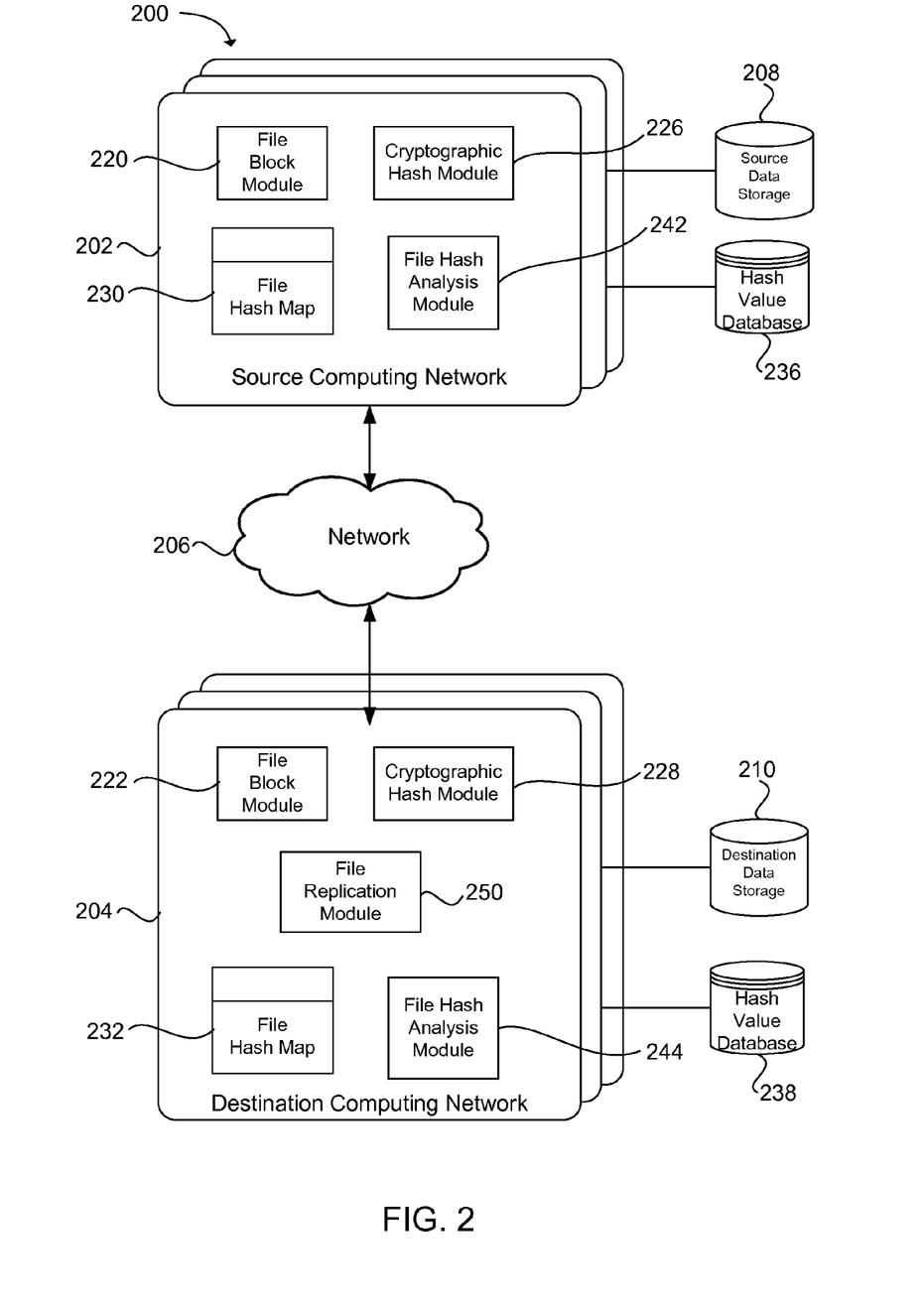
FIG. 2 is a block diagram of an embodiment of a system for communicating a data file between computer networks.

In another exemplary embodiment, illustrated in the block diagram of FIG. 2, the source 202 and destination 204 computing devices can each comprise a network of computing devices. The network can include two or more computing devices networked together. A network connection 206 can be used to interconnect the source and destination networks. The network connection can be a local area network, a wide area network, an internet connection, a wireless connection and the like.

Adapting the system for communicating a data file between networked computers to be functional on two separate networks can provide additional advantages. While a single destination computer may contain some repetitive files with a single source computer, it is more likely that a source network and a destination network will contain duplicate files. Therefore, using the system can result in a greater reduction in the amount of information that flows between the two networks relative to the data flow between two single computers using the system.

Selected files on the source computing network 202 can be divided into multiple blocks using the file block module 220. The cryptographic hash module 226 can then be used to assign a hash signature to each block. A file hash map 230 may be created for each file. The hash signature database 236 can be used to store the hash signatures and file information for the blocks in the selected files located on the network. The selected files may be files that are in need of backup, or files that are commonly transferred. As previously discussed, this can be accomplished using a 3-tuple or a 4-tuple for each block. Additional information can also be included as desired. The hash signature database can contain the information for all of the blocks located on the source computing network. Alternatively, multiple hash signature databases may be created on separate computing devices in the network. The multiple databases may be synchronized to enable the information in the databases to be quickly accessed.

Similarly, selected files located on the destination computing network 204 can be divided into blocks using the file block module 222. The file block modules 220, 222 in the source 202 and destination computing networks can use the same scheme to divide the files to enable the blocks of identical files to also be identical. The cryptographic hash module 228 can then be used to assign hash signatures to each block. Identical blocks located on the source computing network and the destination computing network will have identical hash signatures.

As previously discussed with respect to FIG. 1, when a selected file is desired to be transferred from the source computing network 202 to the destination computing network 204 then the file hash map for the selected file can be transferred to the destination computing network. The file hash analysis module 244 located on the destination computing network can be used to determine whether there are duplicate hash signatures located on the destination computing network, thereby inferring that there are duplicate file blocks. The source computing network can then be notified which file blocks are not present on the destination computing network. These file blocks can then be transferred from the source to the destination computing network. Once the file blocks are transferred, the file replication module 250 can be used to replicate the file from the file blocks. The file can then be stored on the destination data storage 210 that is coupled to the destination computing network.

Alternatively, information from the destination computing network hash signature database 238 can be transferred to the source computing network hash signature database 236 at a predetermined frequency. When a file or group of files is requested to be transferred from the source computing network 202 to the destination computing network 204, the file hash analysis module 242 on the source computing network can determine which hash signatures are present on the destination computing network, as recorded in the source network hash signature database 236. The blocks of the selected file or group of files that are not located on the destination computing network can then be transferred. The file replication module 250 can be used to replicate the selected file or group of files from the complete group of file blocks. The selected file or group of files can be stored on the destination data storage device 210.

Files that are stored on the destination computing network 204 or destination computing device 104 can be restored to the source computing network 202 or source computing device 102 if needed. For example, if a source file, or group of source files, was accidentally deleted or lost, the copy from the destination file can be recovered by reversing the protocol above. If a number of files were lost, a user can simply request a group of files that include the known lost files to be copied from the destination computing network (or device) to the source computing network (or device). The system will then transfer from the destination to the source only the file blocks that are not already located on the source. This can significantly reduce the network traffic used to recover data. It can also eliminate the need for a user or information technology specialist to carefully determine which files were lost, since minimal additional bandwidth will be used if duplicate files are requested to be transferred.

Figure 3:
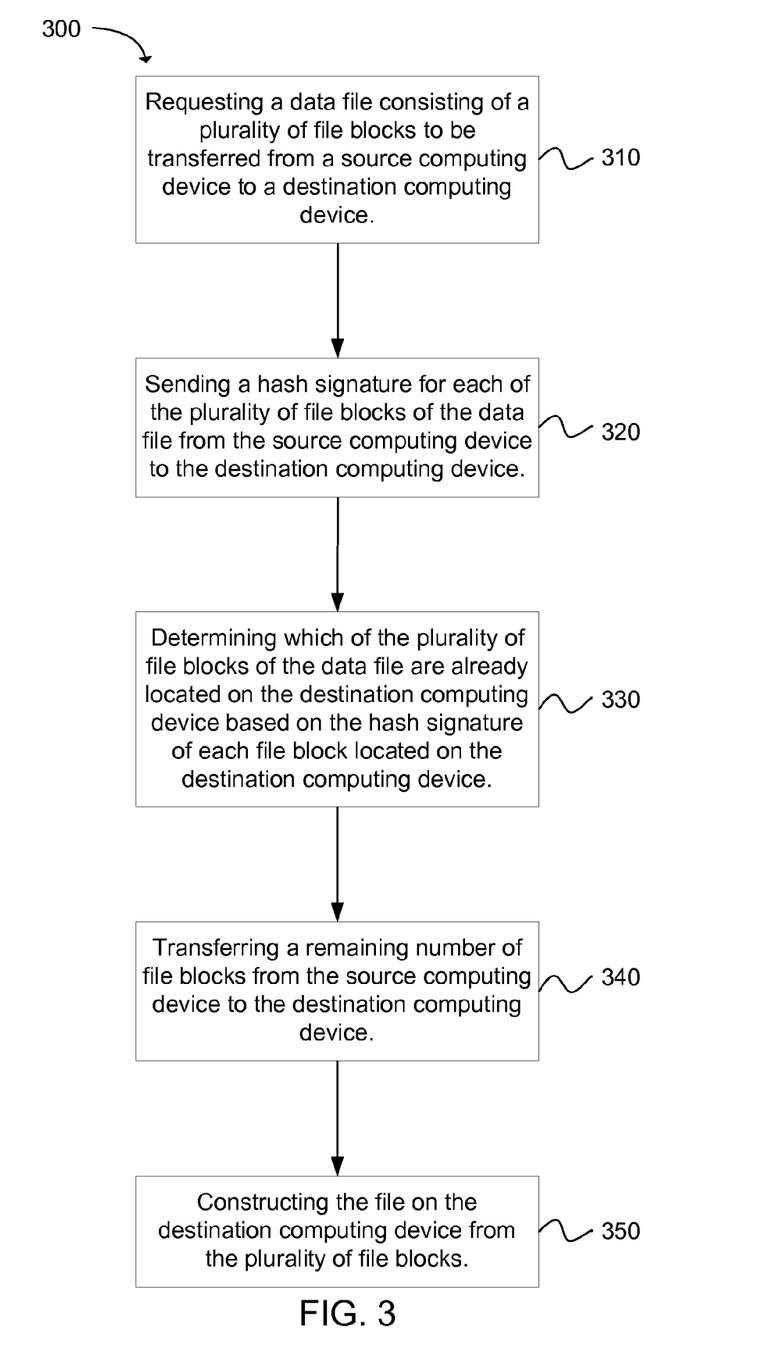
FIG. 3 is a flowchart depicting a method for communicating a data file between networked computers.

In another embodiment, a method 300 for communicating a data file between networked computers is disclosed, as depicted in the flow chart of FIG. 3. The method includes the operation of requesting 310 a data file consisting of a plurality of file blocks to be transferred from a source computing device to a destination computing device. A hash signature for each of the plurality of file blocks in the data file can be sent 320 from the source computing device to the destination computing device.

The method 300 includes the additional operation of determining 330 which of the plurality of file blocks of the data file are already located on the destination computing device based on the hash signature of each file block located on the destination computing device. The file blocks that are not contained on the destination computing device can be transferred 340 from the source to the destination computing device. The file can then be constructed on the destination computing device from the plurality of file blocks.

It can be appreciated that the above method can also be used between a source computer network and a destination computer network, or between a computing device and a computer network.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for communicating a data file between a plurality of networked computers, comprising:
   requesting a data file consisting of a plurality of file blocks to be transferred from a plurality of source computing devices over a network to a destination computing device;
   selecting at least one source computing device from the plurality of source computing devices;
   selecting a length of the plurality of file blocks based on a type of the data file;
   sending a hash signature for each of the plurality of file blocks of the data file from the source computing device to the destination computing device over the network;
   determining which of the plurality of file blocks of the data file are already located on the destination computing device based on the hash signature of each file block located on the destination computing device in order to reduce an amount of network traffic used for transfer of file blocks over the network;
   transferring a remaining number of file blocks from the plurality of source computing devices to the destination computing device over the network; and
   constructing the file on the destination computing device from the plurality of file blocks.

2. A method as in claim 1, wherein sending a hash signature further comprises forming a hash signature for each of the file blocks using a cryptographic hash function having collision resistance.

3. A method as in claim 1, wherein sending a hash signature further comprises forming a hash signature for each of the file blocks using a cryptographic hash function selected from the group consisting of a Secure Hash algorithm type 1 (SHA-1), SHA-2, and SHA-3.

4. A method as in claim 1, wherein sending a hash signature further comprises sending a hash signature for each of the plurality of file blocks of the data file from a hash signature database located on the source computing device.

5. A method as in claim 1, wherein determining which of the plurality of file blocks of the data file are already located on the destination computing device further comprises checking a hash signature database located on the destination computing device for the hash signature for any one of the file blocks of the data file.

6. A method as in claim 1, wherein determining which of the plurality of file blocks of the data file are already located on the destination computing device further comprises checking a hash signature database located on the destination computing device for the hash signature for each of the file blocks of the data file.

7. A method as in claim 1, wherein transferring the file blocks to the destination computing device, further comprises sending a request for the file blocks that are not located on the destination computing device to the source computing device.

8. A method for communicating a data file between computer networks, comprising:
- selecting a source computing network having a data file consisting of a plurality of file blocks;
- requesting the data file to be transferred from the source computing network to a destination computing network;
- selecting a length of the plurality of file blocks based on a type of the data file;
- sending a hash signature for each of the plurality of file blocks of the data file from the source computing network to the destination computing network;
- determining which of the plurality of file blocks of the data file are already located on the destination computing network based on the hash signature of each file block located on the destination computing network in order to reduce an amount of network traffic used for transfer of file blocks over the network;
- transferring a remaining number of file blocks from the source computing network to the destination computing network; and
- constructing the file on the destination computing network from the plurality of file blocks.

* * * * *